(12) United States Patent
Melski et al.

(10) Patent No.: US 10,990,667 B2
(45) Date of Patent: Apr. 27, 2021

(54) SYSTEMS AND/OR METHODS FOR AUTOMATICALLY PROTECTING AGAINST MEMORY CORRUPTION VULNERABILITIES

(71) Applicant: GrammaTech, Inc., Ithaca, NY (US)

(72) Inventors: David Gordon Melski, Ithaca, NY (US); Nathan Taylor Kennedy, Ithaca, NY (US); Drew Christian Dehaas, Ithaca, NY (US)

(73) Assignee: GrammaTech, Inc., Ithaca, NY (US)

(*) Notice: Subject to any disclaimer, the term of this patent is extended or adjusted under 35 U.S.C. 154(b) by 5 days.

(21) Appl. No.: 15/966,604

(22) Filed: Apr. 30, 2018

(65) Prior Publication Data

US 2018/0247057 A1 Aug. 30, 2018

Related U.S. Application Data

(63) Continuation of application No. 14/804,911, filed on Jul. 21, 2015, now Pat. No. 9,990,492.

(60) Provisional application No. 62/028,004, filed on Jul. 23, 2014.

(51) Int. Cl.
*G06F 21/54* (2013.01)
*G06F 12/02* (2006.01)
*G06F 21/57* (2013.01)
*G06F 12/14* (2006.01)

(52) U.S. Cl.
CPC ............ *G06F 21/54* (2013.01); *G06F 12/023* (2013.01); *G06F 21/577* (2013.01); *G06F 12/1441* (2013.01); *G06F 2221/033* (2013.01)

(58) Field of Classification Search
CPC ...... G06F 21/54; G06F 12/023; G06F 21/577; G06F 12/1441; G06F 2221/033
See application file for complete search history.

(56) References Cited

U.S. PATENT DOCUMENTS

| 5,043,870 A | 8/1991 | Ditzel |
| 7,644,246 B2* | 1/2010 | Peinado ............... G06F 12/145 711/163 |
| 9,785,440 B2* | 10/2017 | DeHon ............... G06F 12/1408 |
| 2003/0033498 A1 | 2/2003 | Borman |
| 2004/0139272 A1 | 7/2004 | Rodriguez-Rivera |

(Continued)

OTHER PUBLICATIONS

Hasabnis, Niranjan et al.—Light-weight Bounds Checking, In ACM CGO'12, Mar. 31-Apr. 4, 2012, San Jose, CA, USA (Year: 2012).*

(Continued)

*Primary Examiner* — John B King
*Assistant Examiner* — Richard W Cruz-Franqui
(74) *Attorney, Agent, or Firm* — Nixon & Vanderhye PC

(57) ABSTRACT

Certain example embodiments described herein relate to techniques for automatically protecting, or hardening, software against exploits of memory-corruption vulnerabilities. The techniques include arranging a plurality of guard regions in the memory in relation to data objects formed by the application program, identifying an access by the application program to a guard region arranged in the memory as a disallowed access, and modifying the execution of the application program in response to the identifying, the modifying being in order to prevent exploitation of the memory and/or to correctly execute the application program.

20 Claims, 11 Drawing Sheets

(56) References Cited

U.S. PATENT DOCUMENTS

| | | | |
|---|---|---|---|
| 2004/0199572 A1* | 10/2004 | Hunt | G06F 9/4492 709/201 |
| 2005/0273593 A1* | 12/2005 | Seminaro | H04L 41/069 713/151 |
| 2006/0117169 A1* | 6/2006 | Peinado | G06F 12/145 713/1 |
| 2006/0174077 A1* | 8/2006 | Abadi | G06F 12/1458 711/163 |
| 2007/0128899 A1 | 6/2007 | Mayer | |
| 2007/0288708 A1 | 12/2007 | Saha | |
| 2008/0162829 A1* | 7/2008 | Scott | G06F 9/30181 711/154 |
| 2008/0184016 A1 | 7/2008 | Erlingsson | |
| 2008/0235757 A1 | 9/2008 | Li | |
| 2009/0049163 A1* | 2/2009 | Love | H04L 41/0213 709/223 |
| 2010/0205669 A1 | 8/2010 | Mantripragada | |
| 2011/0231826 A1 | 9/2011 | Narasimhan | |
| 2012/0278665 A1 | 11/2012 | Serebryany | |
| 2013/0132690 A1 | 5/2013 | Epstein | |
| 2014/0082284 A1 | 3/2014 | Abella Ferrer | |
| 2014/0082716 A1* | 3/2014 | Matsuzaki | H04L 67/22 726/8 |
| 2014/0082724 A1 | 3/2014 | Pearson et al. | |
| 2014/0372385 A1 | 12/2014 | Martino | |
| 2015/0161385 A1 | 6/2015 | Gounares | |
| 2016/0026791 A1 | 1/2016 | Melski | |
| 2018/0247057 A1* | 8/2018 | Melski | G06F 21/54 |

OTHER PUBLICATIONS

NPL Search (Google Scholar) (Year: 2021).*
Emery D. Berger et al., "DieHard: Efficient Probabilistic Memory Safety," retrieved Jul. 21, 2015, pp. 1-24.
Konstantin Serebryany et al., "AddressSanitizer: A Fast Address Sanity Checker," retrieved Jul. 21, 2015, 10 pages.
Niranjan Hasabnis et al., "Light-Weight Bounds Checking," retrieved Jul. 21, 2015, pp. 135-144.
Andrea Bittau et al., "Hacking Blind," retrieved Jul. 21, 2015, 16 pages.
Gene Novark et al., "DieHarder: Securing the Heap," retrieved Jul. 21, 2015, 12 pages.
Steven C. Coley et al., Common Weakness Enumeration (CWE) a Community-Developed Dictionary of Software Weakness Types, CWE Version 2.8, Jul. 31, 2014, retrieved Jul. 21, 2015, pp. 1-1557.
Search Report and Written Opinion dated Oct. 9, 2015 in corresponding International Application No. PCT/US15/41381, 18 pages.
Niranjan Hasabnis et al., "Light-Weight Bounds Checking," Proceedings of the 10th International Symposium on Code Generation and Optimization, CHO '12, XP055432212, Jan. 1, 2012, 10 pages.
Michele Co et al., "PEASOUP: Preventing Exploits Against Software of Uncertain Provenance (Position Paper)," Proceeding of the 7th International Workshop on Software Engineering for Secure Systems, SESS '11, Jan. 1, 2011, XP055432192, pp. 43-49.
Supplemental European Search Report dated Dec. 14, 2017 in corresponding European Application No. 15824645.4, 9 pages.
Extended European Search Report dated Feb. 11, 2019 in corresponding European Application No. 18212260.6, 4 pages.

* cited by examiner

400

```
Save registers and flags needed for comparison
If (get_n_bytes(A) != n_byte_guard_value)
    goto SAFE;
Perform additional checks
SAFE:
Restore registers and flags used in comparison
instr           ;; the original instruction
```

FIG. 4

```
int dummy = 0;
int dummy_ptrs[256] = { & dummy, };
dummy_ptrs[guard_value] = nullptr;
```

FIG. 5

```
save contents of register r
load byte at address A into r
load dummy_ptrs[r] into r
load *r into r  ;; faults iff r==guard_value
restore the contents of r
```

FIG. 6

Randomly select a small-guard value (from infrequent 1-byte values)
Set the bytes at offsets 0, 4, 6, and 7 to the small-guard value
Set the bytes at offsets 1–3 and 5 randomly

FIG. 7

```
Save program registers and flags needed for check
    If (byte stored at A differs from the small-guard value)
        goto SAFE;
    If ((16-bytes stored at A differs from the full-guard value) AND
        (A is not in guard maps for heap and static data))
        goto SAFE;
    Initiate response for unsafe access
SAFE:
    Continue with execution of dangerous instruction
```

FIG. 11

SYSTEMS AND/OR METHODS FOR AUTOMATICALLY PROTECTING AGAINST MEMORY CORRUPTION VULNERABILITIES

CROSS-REFERENCE TO RELATED APPLICATIONS

This application is a continuation of application Ser. No. 14/804,911 filed Jul. 21, 2015, which claims the benefit of U.S. Provisional Patent Application No. 62/028,004 filed on Jul. 23, 2014, the entire content of each of which is hereby incorporated herein by reference.

TECHNICAL FIELD

Certain example embodiments described herein relate to techniques for computer software processing. More particularly, certain example embodiments relate to techniques for automatically protecting, or hardening, software against exploits of memory-corruption vulnerabilities.

BACKGROUND AND SUMMARY OF EXAMPLE EMBODIMENTS OF THE INVENTION

Software applications may contain flawed logic, or faults. A carefully crafted malicious input and/or program may exploit the faults in a software application in a manner that causes the application to deviate from its intended behavior. Such deviation may have potentially dangerous consequences for the application's user and/or the system on which the application is running. Such faults are often referred to as "software vulnerabilities" or simply "vulnerabilities". Memory-corruption vulnerabilities are important class of software vulnerabilities that lead to corruption of an application's in-memory data. A taxonomy of software vulnerabilities known as the Common Weakness Enumeration (CWE Version 2.8, "CWE—Common Weakness Enumeration," MITRE 2014-7-31) provides a categorization of some possible vulnerabilities.

Although numerous techniques are available for detecting and handling software vulnerabilities, many conventional techniques do not provide an efficient and robust system capable of detecting and handling the wide range of possible software vulnerabilities. Embodiments of the present invention provide a robust and efficient technique for automatically protecting, or hardening, software against exploitation of memory-corruption vulnerabilities.

An example embodiment provides computing system comprising at least one memory and at least one processor configured to execute a security-enhanced application program. The program includes arranging a plurality of guard regions in the memory in relation to data objects formed by the application program, identifying an access by the application program to a guard region arranged in the memory as a disallowed access, and modifying the execution of the application program in response to the identifying. The modifying may be in order to prevent exploitation of the memory and/or to correctly execute the application program.

The identifying an access in example embodiments may include at least one of (A) tracking memory object creation and deletion, and (B) detecting whether a memory access by the application program is a disallowed access to a guard region.

The program may further include placing bipartite guards in the guard regions arranged in memory, the bipartite guards each having a predetermined number of bits. The detecting whether a memory access is a disallowed access comprises may include determining an address associated with the memory access, and determining whether at least one of the bipartite guards placed in the guard regions is located at the determined address.

Placing bipartite guards may in example embodiments include placing a predetermined small guard value in one of the bipartite guards at one or more predetermined offsets. Determining whether at least one of the bipartite guards are located at the determined address may include checking whether the predetermined small guard value is positioned at the determined address.

Placing the bipartite guards may in example embodiments further include arranging uniformly randomly selected bytes in parts of the bipartite guards where no predetermined small guard value is placed. Determining whether at least one of the bipartite guards are located at the address may include, if the predetermined small guard value is positioned at the address, determining if a multi-byte aligned word containing the determined address holds a full guard value.

The predetermined small guard value may in example embodiments be one byte in size. The bipartite guard may be placed in all guard regions when they are created and is removed before the region is reused.

Determining whether at least one of the bipartite guards are located at the address may in example embodiments further include arranging a computation that may cause a runtime exception if and only if the full guard value is present.

An example embodiment may in example embodiments further include performing an exclusive-or operation of data in a guard map with a guard value in order to populate a substantially larger portion of the guard map with the guard value.

In some example embodiments, the tracking may include at least one of (A) for a portion of the memory that is a stack memory, directly mapping between a region of the stack memory that is being mapped and the map, (B) for a portion of the memory that is a heap memory, using a heap map to infer locations of the guards in the heap, and (C) for a portion of the memory that is a static memory, using standard data structures for representing sets to store a fixed set of said guard regions.

In some example embodiments, the tracking may include detecting a reuse of a block in a heap portion of the memory based upon whether (1) the block is returned from a function that sometimes returns uninitialized memory acquired directly from a memory allocation, and/or (2) the block is returned from a function having fewer than a predetermined number of external arguments.

In some example embodiments, the tracking may include detecting a reuse of a block in a heap portion of the memory based upon whether (1) the block contains data originally read from an external source, and (2) the data is overwritten with different data from an external source.

In some example embodiments, the tracking may include protecting a first set of areas of the memory using said bipartite guards and without guard maps, and protecting a second set of areas of the memory using homogenous guard values and guard maps.

In some example embodiments, the tracking may include, when a data object is freed by the application program, marking a region of the memory used by the data object as a guard region, and wherein the marking includes overwriting the region with guard values.

In some example embodiments, freed memory regions are marked with a dedicated unalloc-mem guard value distinct from other classes of guard values and detecting a use-after-free error comprises checking for the unalloc-mem guard value.

In some example embodiments, the tracking may include, when a data object is freed by the application program, before said overwriting, saving current contents of the region; and if a subsequent use of the region is detected, restoring the region using the saved contents.

In some example embodiments, wherein determining if an access to a memory location computed as (base+offset) is a disallowed access further includes checking if base is in a guard region.

In some example embodiments, wherein determining if an access to a memory location computed as (base+offset) is a disallowed access further comprises checking if base and (base+offset) are in the same heap block.

In some example embodiments, wherein modifying the execution of the application program includes: automatically determining when a memory overrun occurs by detecting an attempted access of the guard region at the end of a block in a heap portion of the memory; automatically marking another block adjacent to the block as allocated; and/or providing for overrunning code to continue into the marked block.

In some embodiments, modifying the execution of the application program may include automatically determining when a memory overrun occurs by detecting an attempted access one of the guard regions at the end of a first block in a heap portion of the memory, allocating a second block in the heap portion, wherein the second block is larger than the first block, copying data from the first block to the second block, converting the first block into a guard region such that subsequent accesses to the first block are detected as attempted accesses to one of said guard regions, and when a subsequent access to the first block is detected, redirecting the access to instead access the second block.

Some embodiments may further include inserting read guards in newly allocated memory and/or memory that holds stale data, checking read accesses to determine whether an inserted read guard is accessed, thereby detecting runtime uses of uninitialized memory and/or potential information leaks, and removing an inserted read guard when a write access to the inserted read guard is detected.

Some embodiments may further include intercepting library calls writing a variable amount of said memory up to a specified maximum, and identifying portions of the memory between the end of said variable amount written and the specified maximum as stale data that the subject program no longer uses.

Some embodiments may further include at least one of (A) detecting an attempted scan of the memory by placing page guards on selected pages, or (B) detecting an attempted scan of the memory by inserting hooks in selected portions of code to check for the page guards.

An example embodiment provides a method for executing a security-enhanced application program on a computing system comprising at least one memory and at least one processor. The method includes: arranging a plurality of guard regions in the memory in relation to data objects formed by the application program, automatically identifying an access by the application program to a guard region arranged in the memory as a disallowed access, and automatically modifying the execution of the application program in response to the identifying. The modifying being in order to prevent exploitation of the memory and/or to correctly execute the application program.

An example embodiment provides a non-transitory computer readable storage medium storing a security-enhanced application program which, when executed by a processor of a computing system including a memory, causes the computing system to perform operations comprising: arranging a plurality of guard regions in the memory in relation to data objects formed by the application program, automatically identifying an access by the application program to a guard region arranged in the memory as a disallowed access, and automatically modifying the execution of the application program in response to the identifying. The modifying may be in order to prevent exploitation of the memory and/or to correctly execute the application program.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4 illustrates example pseudo code for checking for a guard value at memory a location, in accordance with some embodiments;

FIG. 5 illustrates example pseudo code for initializing data, in accordance with some embodiments;

FIG. 6 illustrates example pseudo code for checking whether a memory location contains a guard value, in accordance with some embodiments;

FIG. 7 illustrates example pseudo code including constructing a guard, in accordance with some embodiments;

FIG. 11 illustrates pseudo code for an example technique for checking whether an address is safe, according to some embodiments.

DETAILED DESCRIPTION OF EXAMPLE EMBODIMENTS OF THE INVENTION

According to some embodiments of the present invention, a system for automatically protecting, or hardening, software against exploits of memory-corruption vulnerabilities is provided. Vulnerabilities that are guarded against by example embodiments may include one or more of: CWE-120 Buffer Copy without Checking Size of Input ('Classic Buffer Overflow'), CWE-121 Stack-based Buffer Overflow, CWE-122 Heap-based Buffer Overflow, CWE-124 Buffer Underwrite ('Buffer Underflow'), CWE-126 Buffer Over-read, CWE-127 Buffer Under-read, CWE-129 Improper Validation of Array Index, CWE-134 Uncontrolled Format String, CWE-170 Improper Null Termination, CWE-415 Double Free, CWE-416 Use After Free, CWE-457 Use of Uninitialized Variable, CWE-590 Free of Memory not on the Heap, CWE-665 Improper Initialization, CWE-761 Free of Pointer not at Start of Buffer, CWE-762 Mismatched Memory Management Routines, CWE-805 Buffer Access with Incorrect Length Value, CWE-806 Buffer Access Using Size of Source Buffer, CWE-824 Access of Uninitialized Pointer, and CWE-908 Use of Uninitialized Resource.

Certain example embodiments protect software that run on general purpose electronic computing hardware, including personal computers, servers, and embedded devices such as, but not limited to, smart phones or gaming consoles. Software applications protected by example embodiments include, but are not limited to, software that manually manage memory resources, for example, by using a combination of a system library procedure, such as malloc, and a runtime stack that is typically maintained by updating one or more dedicated hardware registers.

Embodiments described herein may use any combination of one or more disclosed techniques for automatically protecting, or hardening, software against exploits of memory-corruption vulnerabilities. These techniques include, for example: modifying the application program to change the way it arranges its data, specifically to insert "guard regions" between the application program's data objects; tracking the guard regions as they are created and destroyed (corresponding to the allocation and release of memory regions by the subject program as it executes); checking potentially dangerous memory accesses by the subject program to ensure they are not accessing guard regions in a disallowed manner; tracking additional information about the usage of memory regions to identify when memory is about to be reused and the old contents can be cleared; and/or modifying the program execution when a dangerous access (i.e., access to an area with a guard value) is detected so that the state of the subject application program is not compromised (i.e., exploited), and the application program continues to execute correctly.

Figure 1:
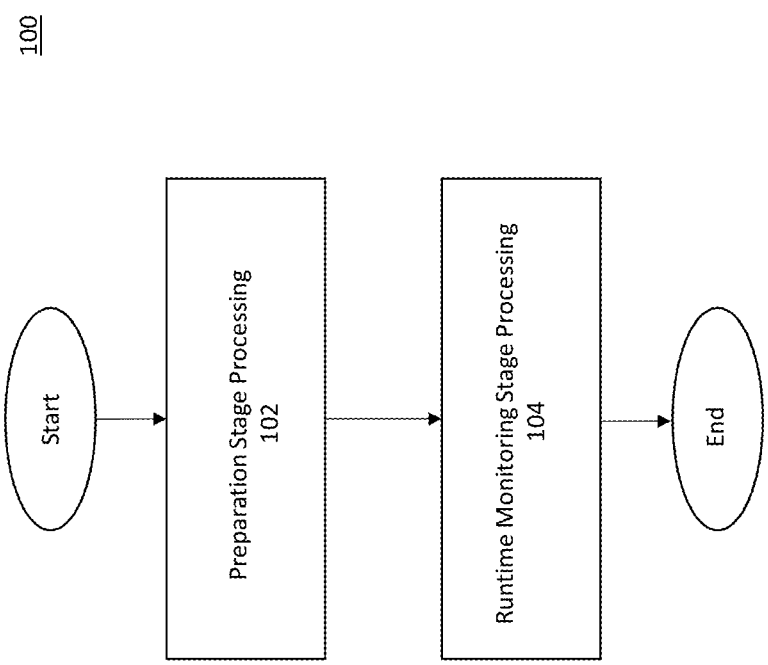
FIG. 1 is a flow chart illustrating the overall process for automatically protecting, or hardening, software against exploits of memory-corruption vulnerabilities, according to one or more embodiments.
Figure 2:
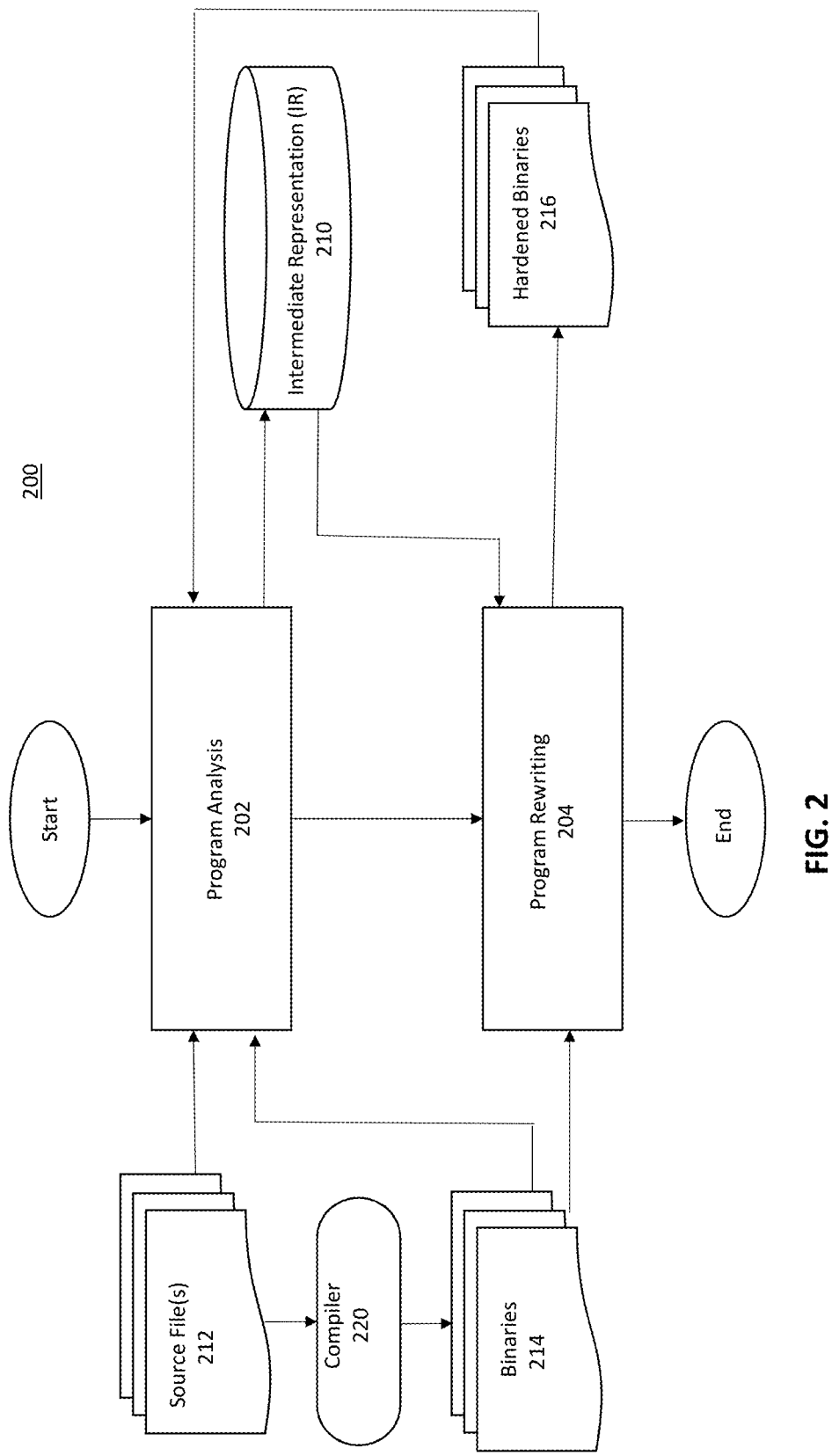
FIG. 2 illustrates an interaction chart illustrating aspects of the preparation stage processing, according to some embodiments.
Figure 3:
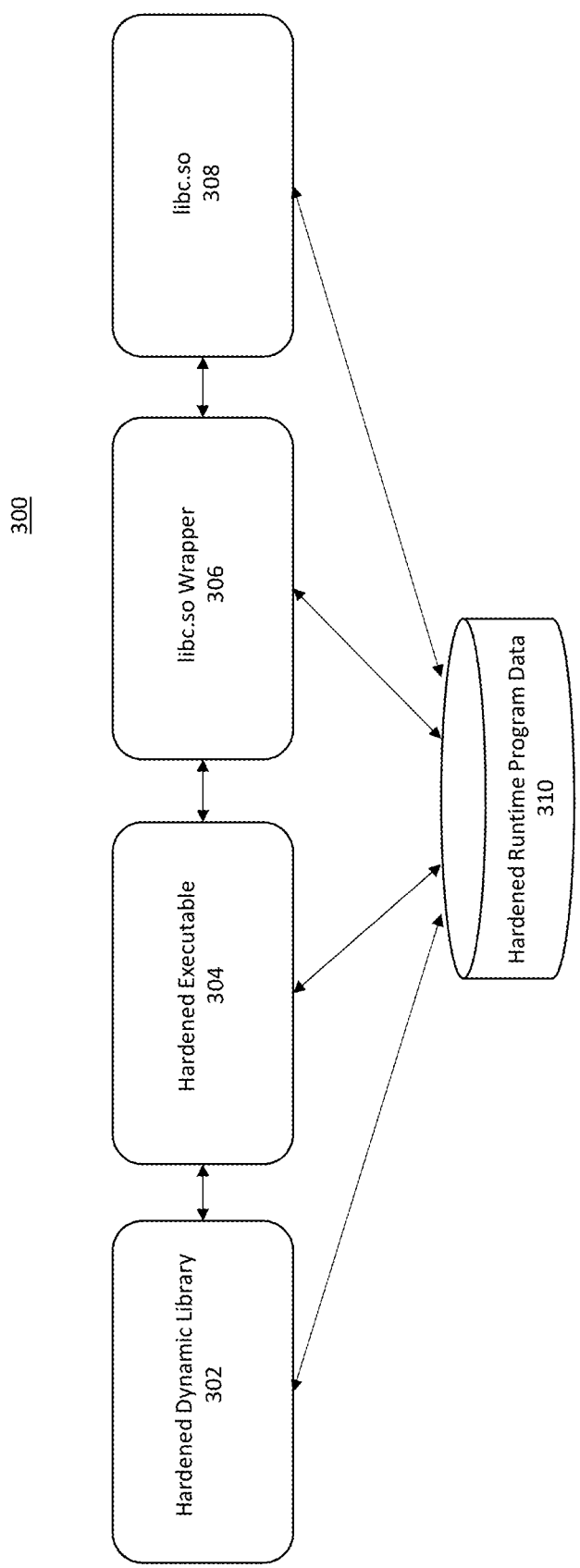
FIG. 3 illustrates an interaction chart illustrating aspects of the runtime monitoring stage, according to some embodiments.

FIG. 1 illustrates a flowchart 100 of a process for protecting software in accordance with example embodiments. As shown in flowchart 100, the process 100 protecting of software against vulnerabilities operates in two stages: a preparation stage 102 and a runtime-monitoring stage 104. FIG. 2 shows a flowchart 200 for an implementation of the preparation stage. FIG. 3 shows a flowchart 300 for an implementation of the runtime-monitoring stage.

The preparation stage is typically performed offline (i.e., when the application program is not executing). During the preparation stage 102, a process at operation 202, according to an example embodiment, uses program analysis to determine characteristics about the application program that is to be protected. The application program that the user intends to protect by process 100 is referred to herein as the "subject application program" or simply the "application program". Many different types of program analysis can be applied, including, for example, static and dynamic analysis and source code and machine-code analysis. For example, the source code 212 of the application program, and binaries 214 resulting from compiling (e.g., using a compiling process 220) may be provided as input to the program analysis at operation 202. The program analyzer(s) are used to construct a representation of the subject application program. The constructed representation is sometimes referred to as an Intermediate Representation (IR) 210. The IR 210 may capture some or all of the characteristics such as the following regarding the application program that is being analyzed: instructions that may perform potentially dangerous memory operations, instructions that allocate and deallocate memory, data layout of the program, instructions that directly address globally allocated or stack-allocated data, functions that "recycle" heap-allocated buffers, functions that are "wrappers" for the system's heap-management library, and functions that implement custom memory-management libraries on top of the system's heap-management library.

Some embodiments identify instructions that perform potentially dangerous memory operations by disassembling all, or some portion of, possible instructions in the binary file and identifying instructions that access memory. Some other embodiments refine this program analysis by assuming that instructions that access a fixed memory location or stack offset is/are safe. The data layout of the program can be determined by processing "shape analysis". Shape analysis requires additional analysis of the generated IR 210 to determine which data structure abstractions are used by the application program and how these structures can be written and accessed at run time.

For some application programs, one or more characteristics of the application program such as those noted above, may be unavailable or inaccurate. In many such cases, embodiments can still operate to protect the system; however, it may provide a degraded level of protection, or require more extensive testing to ensure that the intended functionality of the subject application program is not compromised or broken.

At operation 204, the generated IR 210 is used to rewrite the subject program's binaries 216, including its executable files and libraries, if any. The rewriting operation 204 results in hardened binaries 218 that include protections provided by the embodiments. If test suites are available, they may be used to test the hardened binaries 218 to ensure the intended application program behavior is provided by the hardened binaries 218.

As noted above, often the preparation stage processing 102 can be performed in an offline manner. An alternative approach is to perform some or all of the preparation processing steps "on-the-fly" as the user runs the application program.

The runtime-monitoring stage 104 of protections provided by example embodiments occur when the protected application program is used (i.e., when the protected application program is executed). The protections for the application program and/or system can be implemented, as shown in the flow chart 300, by the hardened libraries 302, hardened executable(s) 304, and/or dedicated libraries 306 that are configured to perform checks for memory-safety violations by interposing between the application program and common system libraries, such as libc.so 308. As the hardened binaries run (i.e., are executed), they implement the protections inserted during the preparation stage 102. For example, the hardened binaries 304 may use a hardened runtime program data 310 including, for example, a modified data layout 310 that includes guard regions, maintains metadata of the embodiments, including, for example, current locations of guard regions, and checks for unsafe memory accesses, including accesses that should access the application program's data 310 but are accessing a guard region. When the hardened binaries 216 call procedures in system libraries 308 that manipulate memory (e.g., via libc.so 308), some example embodiments may intercept the call in its hardened libraries 306, and perform additional checking and updating of metadata, before calling the underlying library procedure if it is determined to be safe.

Example embodiments may use a combination of techniques to protect against memory corruption. For example, an embodiment may protect an application program by using one or more of guard regions, clearing stale data, altering de-allocation patterns and actions, taint inference and propagation, and one or more repair strategies.

Guard regions (sometimes also referred to as guarded regions) are regions of memory selectively identified by embodiments as areas that the application program has no valid reason to access. In other words, the application program, if operating correctly as designed, has no reason to access the identified guard areas. Embodiments may transform the layout of the application program's data so that guard regions are interspersed with the program's legitimate data. The guard regions may be located in memory based on the IR that is generated during the preparation stage. For example, guard regions may be placed at the end of heap blocks, in between procedure activation records, in between data objects on the stack, and/or in between global data objects. Some embodiment may also replace instructions or procedure calls that can potentially perform unsafe memory accesses with code that checks that the locations to be accessed are not in guard regions before performing the accesses. Doing so helps ensure that the hardened program accesses data in a safe manner.

When a memory block is freed, some example embodiments may mark the memory as a guard region. The marking may include overwriting the memory with predetermined guard values. Checks for accesses of guarded regions will then detect if the memory is used after it has been freed, but before it has been reallocated (i.e. "use-after-free" fault). According to an embodiments, for any memory accesses in the application program where an accessed location is computed by adding an offset to a base address, an additional check of the value held at the base address is inserted to see if it contains an unallocated memory guard. If it does, the heap manager is consulted to determine if base and base+offset are located in the same heap block. If they are located in the same heap-block, a use-after-free error is identified.

In order to recover from, or repair, a use-after-free fault, some embodiments may save the current contents of the faulty block, and if a subsequent use of the block is detected, restore the saved contents and mark the block as "in use."

Some embodiments may clear stale data in regions that are reused as a technique for protecting against memory corruption. Embodiments may use various techniques to recognize when a program is reusing a region of memory. Before reuse of a region occurs, some embodiments may operate to clear the old data and/or convert the region to a class of guard region that indicates that the region should be initialized before being read. Certain example embodiments thus may supplement the garbage collector in a garbage-collected environment such as Java, for example, by inferring and marking used in memory segments. Doing so helps to ensure that data is scrubbed when it is no longer needed, thereby reducing the likelihood that malicious programs may be able to access forgotten-about and/or leaked memory areas and the data stored therein.

Another technique that may be used by some embodiments for protecting against memory corruption is the altering of de-allocation patterns and actions. Altering de-allocation patterns and actions may, for example, include delaying re-introduction of newly freed memory to the available memory pool. When an application program explicitly deallocates a memory region by calling a function such as free( ), or the like, example embodiments may delay the return of the memory to the pool of memory available for reuse. In some embodiments, as soon as a memory block is placed in quarantine, for example, after a free( ) on the block, it is converted to a type of guard region that indicates it has been freed and should not be accessed by the subject application program. If some embodiments detect an access to a guard region that is in quarantine after a free( ), a use-after-free error may be indicated to the user. Example embodiments may be able to repair the error by avoiding reallocation of the block.

Some example embodiments may be configured to use a combination of lightweight taint inference and taint propagation to recognize and/or repair certain classes of dangerous memory-usage errors such as use of uninitialized memory and buffer overruns.

When an example embodiment detects that a memory-corruption error is about to occur, it may use a variety of repair techniques to counter the threat. These include replacing the values that would be returned by an errant memory read and early termination of errant computation (e.g., in a loop, thread, or process). An embodiment may also report potential memory-corruption errors, which then allows administrators to check for attacks and allows developers to repair faults.

Some or all of these and/or other techniques may be implemented by the modifications made to the subject application program and in the libraries specific to certain example embodiments.

As described above, certain example embodiments may use guard regions to detect potentially unsafe memory accesses. In order to use utilize guard regions, the subject application program may be modified in embodiments (1) to intersperse guard region with the application program's data, (2) to update the embodiment's data about where the guard regions are located, and (3) to check that potentially unsafe instructions do not access a guard region in a disallowed manner. Interspersing guard regions as in (1) and updating the subject application program's data as in (2) involve modifications to the steps the application program takes to allocate and deallocate memory. Checking potentially unsafe instructions as in (3) involves modifications to instructions used to access memory.

In general, performing the modifications for (3) reasonably can be expected to incur a substantially higher runtime overhead than (1) and (2) in example implementations, as memory accesses may be expected to occur orders of magnitude more often than memory allocation and deallocation. The techniques that are selected for implementing (1)-(3) may depend on factors such as, for example, the performance characteristics of each subject execution platform, the context of individual instructions in the application program to be instrumented, and/or the like. In order to make (3) effective, example embodiments may use a series of nested tests to check if the application program should be allowed to access the values at a given address. The earlier tests of the series of nested tests are designed to be cheap when compared to later tests. The early tests (i.e., tests occurring earlier in the nested tests), however, may have higher false positives than the later tests. It is possible an early check will report that an address should not be accessed when it is safe to do so. Subsequent checks are more expensive, but have a lower false positive rate. According to at least some embodiments, the final check has a vanishingly small probability of a false positive. Hasabnis et al. in "Light-weight Bounds Checking," in Proceedings of the Tenth International Symposium on Code Generation and Optimization, New York, N.Y., USA, 2012, pp. 135-144, discusses some aspects of nested tests. In contrast to conventional techniques, some embodiments may maintain only a partial map of guard regions or no map at all, they may use a branch-free technique for the early tests, they may use different tests for different instructions in the same protected application, they may use different types of guard regions to detect different types of memory errors, and they may implement a recovery plan to provide safe, continued execution when an error is detected.

Guard regions are filled with predetermined guard values. A check (or as described below, multiple checks) that may be performed by certain embodiments to determine if an address A is safe, is to check if the value stored at memory location A is a guard value (e.g., a predetermined guard value written to that guard region by the embodiment). If the value at A is not a guard value, A is assumed to not be in a guard region, and is assumed to be safe; if the value at A is a guard value, A may be determined to be in a guard region and therefore unsafe. In some embodiments, further checking may be performed to determine whether or not A is unsafe when the value at A is a guard value. Example embodiments may perform the check for the guard value, perform subsequent checks, and select guard values, in accordance with the procedures described below. It will be appreciated that there are multiple techniques that can be used for some of these steps and, in certain example embodiments, multiple strategies may be used in any suitable combination, sub-combination, or combination of sub-combinations, e.g., to protect a single binary, e.g., as is made more clear below.

FIG. 4 illustrates example pseudo code 400 describing a technique that may be used in certain example embodiments to check for a guard value at memory location A when a subject application program includes an instruction instr that accesses n bytes at address A. The technique shown in FIG. 4 has the advantage of being relatively simple (e.g., relatively easy to implement) and relatively cheap (e.g., relatively low processing and/or time overhead). Depending on the machine architecture, in some platforms, it may incur overhead for introducing additional memory accesses (to save and restore program state) and an additional conditional-branch instruction.

Certain example embodiments may opt to use a branchless implementation of some check(s) for guard values at an address A. The idea is to read the value v stored at A and perform a calculation that would cause a hardware exception if v is a guard value. For example, to check for the guard value in a register R, an embodiment may perform a bitwise exclusive-or of R with the guard value so that R will hold zero if and only if it original held the guard value. The embodiment may then use R in an address computation and memory access that will access protected memory if and only if R is zero. To use a SIGSEGV fault for a check, before beginning execution of the subject application program, certain example embodiments may initialize some static data as shown in FIG. 5. Thereafter, to perform the desired check (e.g., to determine "does A contain a guard-value byte?"), the example embodiments may insert example instrumentation such as that shown in FIG. 6 in the subject application program.

In addition to avoiding the use of branches, instrumentation similar to that shown in FIGS. 5-6 may require saving and restoring less state. If certain example embodiments can identify a free register at the location where it wants to insert the check, it is possible that no state will need to be saved or restored. A mix of different checking strategies may be used for different instructions in the subject program.

According to some embodiments, for each instruction with a potentially unsafe memory access in the subject application program, a customized instruction sequence may be used to check if the instruction is safe. For some potentially dangerous instructions, certain embodiments may use a chain of compare-and-branch instructions; for others, embodiments may use one of the hardware-exception mechanisms described in the previous section. Instructions may be identified as dangerous based upon a predetermined list of potentially dangerous instruction types, predetermined parameters or ranges of parameters values identified as potentially dangerous, and/or based on other techniques. Some example embodiments may use dynamic instrumentation to insert the checks and may also change the checking instrumentation based on online profiling information.

As described above, certain example embodiments may perform an initial check for a guard value that may be followed by a more thorough check. This initial check is quick (e.g., low overhead in processing/time) but may not be accurate. Using a technique referred to herein as bipartite guard values, the initial check may be for a 1-byte (8 bit) small-guard value, and the subsequent more expensive check may be for a full 8-byte (64 bit) full-guard value. To check if a memory access to address A is in a guard region, the system may first check if the byte at address A holds the small guard value. If it does, the system can then check if the 8-byte aligned word containing A holds the bipartite guard value. If it does, either it is assumed that A is in a guard region, or one or more expensive checks may be performed. If the memory access to be checked is for 8-bytes, then the small-guard check may be skipped, as the full-guard check should add no measurable overhead. The small guard value may be selected randomly, but preferably excluding the most common 8-bit values, such as 0 and −1. The small guard value may be placed in the bipartite guard value at offsets that might be addressed by aligned, strided accesses on the target machine. For example, on a little-endian, byte-addressable machine, this would be byte offsets 0, 4, 6, and 7 (See FIG. 8). The full (e.g., bipartite) guard is constructed at the beginning of program execution, as shown (assuming a little-endian machine) in the pseudo code of FIG. 7, for example. The bipartite guard value may be placed in all guard regions when they are created and removed before the region is reused. In some embodiments, the bytes of the bipartite guard that do not hold the small-guard value hold bytes selected uniformly at random.

Figure 8:
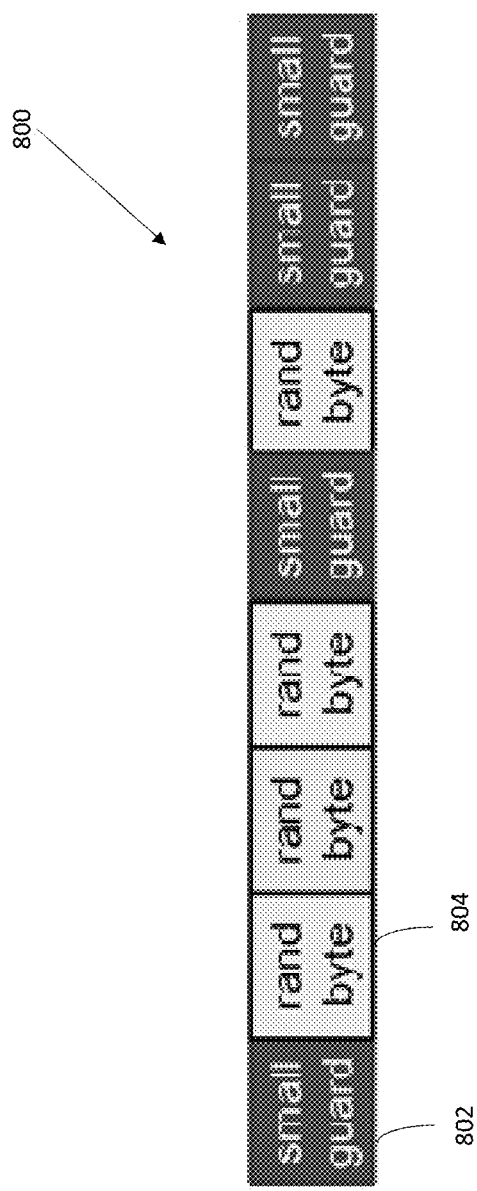
FIG. 8 illustrates an example layout of a bipartite guard, according to some embodiments.
Figure 9:
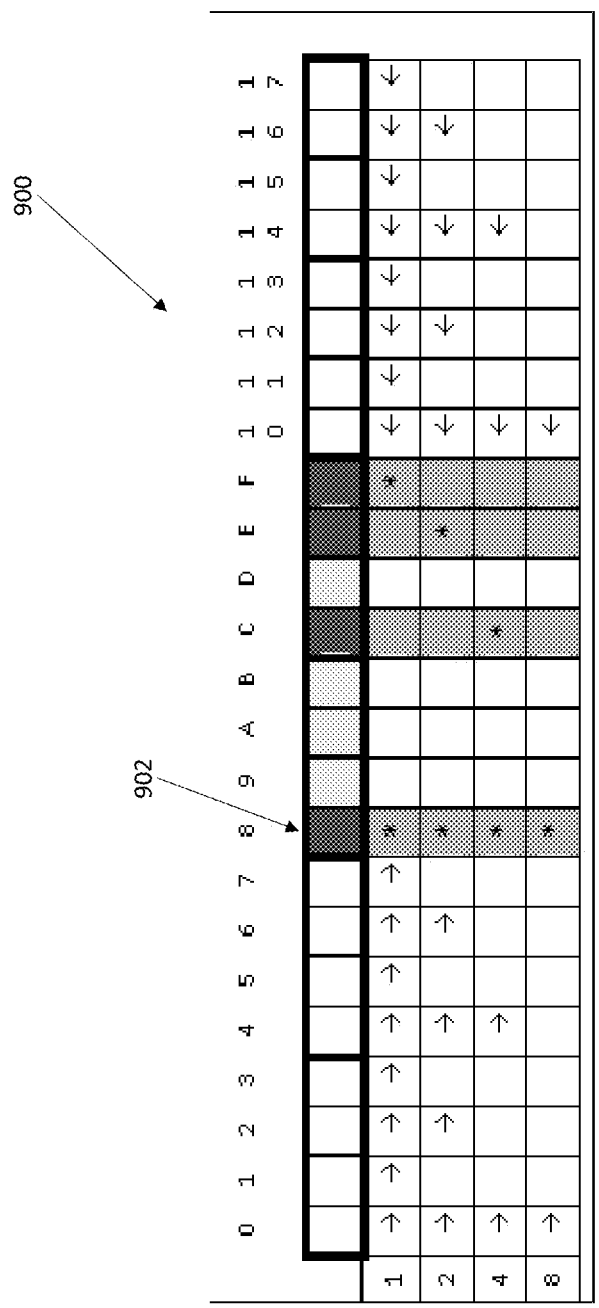
FIG. 9 illustrates an example layout of a bipartite guard, according to some embodiments.

FIG. 8 shows the layout of a bipartite guard 800 on a little-endian machine, according to certain example embodiments. This layout is motivated by the observations that compilers usually try to align data on word boundaries, and that loops that overrun or underrun a buffer are usually accessing the buffer in a power-of-two stride (e.g., 1-byte, 2-bytes, 4-bytes, or 8-bytes on an 8-byte machine). Location 802 in the bipartite guard includes a small guard value, and location 804 includes a randomly selected byte value. As shown in FIG. 9, the layout 900 of the bipartite guard, including the repetition of the predetermined small-guard value, ensures that aligned, strided buffer accesses will land on a small-guard value in the bipartite guard. Byte 902 represents the byte 802 in the bipartite guard 800. Other small guard values are at offsets 4, 6 and 7. Randomly selected byte values are at offsets 1, 2, 3 and 5. The randomly selected bytes of the bipartite guard (e.g., at offsets 1, 2, 3, and 5) make it hard to guess the value of the full guard and vanishingly unlikely that the full guard value may arise by chance during the execution of the subject application program. The table rows labeled 1, 2, 4 and 8 in layout 900 represent strided accesses at 1 byte, 2 bytes, 4 bytes and 8 bytes, respectively. In FIG. 9, bytes of the bipartite guard accessed during strided accesses of the various offsets are shown with a marking (a star marking) within table cells corresponding to a particular byte of the bipartite guard that is accessed in each type of strided access. For example, when the stride is at 8-bytes only the first byte (i.e. 0th byte, byte identified as 902) of the bipartite guard is accessed, regardless of whether the iteration order is forward or backwards through memory (see the row identified as 8 in FIG. 9). When the stride is 2, a buffer overrun (from a forward iteration through the buffer) will result in an attempted access of byte 0 and a buffer underrun (from a backward iteration through the buffer) will result in an attempted access of byte 6 (see the row identified as 2 in FIG. 9); since both bytes 0 and 6 hold a small guard value, a full guard check is triggered and any attempted overrun or underrun is detected and prevented before other bytes of the guard are accessed.

An alternative to using bipartite guards, or an approach that may be used in combination with it, is to maintain guard maps. Guard maps may provide even stronger protections against memory corruption by, for example, protecting against misaligned accesses by an attacker. Guard maps are one or more maps maintained by certain embodiments to keep track of where in memory the guard regions are located. The maps are updated every time memory is allocated or deallocated. The guard value may include repeated copies of a randomly selected 1-byte value. The initial check may always check for n-copies of the guard value (e.g., small-guard value), where n is the number of bytes that are accessed in the instruction that is being checked. The more expensive check consults the maps for the presence of the untrusted address: if it is in a guard region, then the attempted access is unsafe.

Figure 10:
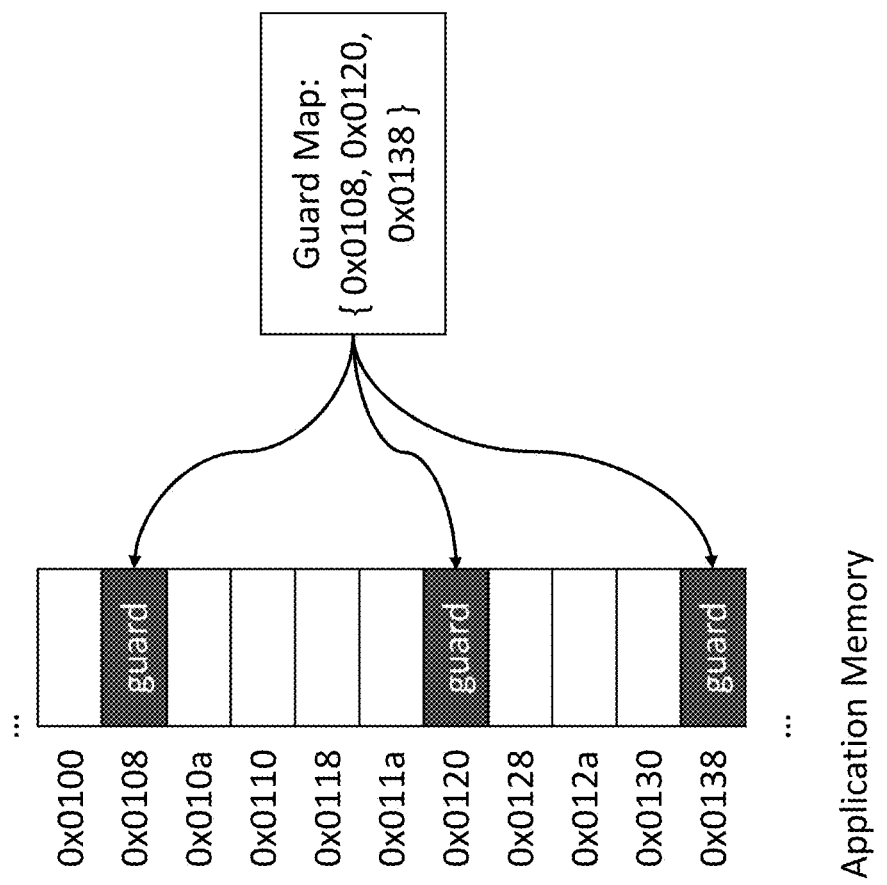
FIG. 10 illustrates a guard map according to some embodiments.

Certain example embodiments may use a trie or other suitable data structure to implement a single guard map for the entire application program. However, in more secure embodiments, embodiments may use more than one guard map, or different types of guard maps for different memory regions. FIG. 10 illustrates an example guard map.

For each thread stack, example embodiments may use a direct map cache, e.g., that contains a single bit for each byte in the stack. Embodiments may use direct mapping between the region of the stack memory that is being mapped and the map. Each byte of memory in the stack can be represented by a single bit in the map. Typically, functions in the subject application program may have a fixed layout for the function's local, temporary data that is stored on the stack. An embodiment may create a template map for each activation record. When a function is invoked and space for its temporaries is allocated on the stack, the embodiment can copy the function's associated map template directly onto the map.

A direct-map cache, in certain embodiments, is similar to a one-level trie. An advantage of using the direct-map cache is improved speed of update and access. Embodiments may leverage the fact that every time an activation record for procedure foo is created on the stack, it may use exactly the same data layout, and hence, the guard regions may be exactly the same. This means that example embodiments can prepare a template that contains the appropriate bit pattern representing the locations of the guard regions in foo's activation record and simply copy it to the end of the map for the currently running thread. Similarly, a template can be used for initializing the guard values in the activation record.

For heap-allocated memory, example embodiments may leverage the internal data structures of the heap-manager to also keep track of the guard regions in the heap. Certain example embodiments may be such that their implementation of the heap-manager may already maintain the requisite information, so that no additional overhead or data structure is necessary. For example, in some embodiments, the heap manager may already map all of the blocks in the heap, and leverage the existing heap map to infer the location of guards in the heap.

For statically-allocated memory (such as, for example, the program's "global data"), certain example embodiments may use a hash table or similar data structure to store the locations of the guard regions, which do not change during the program's execution. Some embodiments may use standard data structures for representing sets (e.g., hash tables) to store the fixed set of guard regions.

According to certain example embodiments, implementing the more expensive check for guard values (in contrast to the relatively quick initial test), includes separately checking each map. In some embodiments, the multiple maps may be checked sequentially, and in other embodiments two or more of the maps may be checked in parallel.

A potential danger in using guard maps is that an attacker may be able to force an errant-memory update that corrupts the map, thereby allowing more latitude in forcing other unsafe memory accesses. The inventors have observed that with a particular implementation of a guard map (e.g., using a direct-map cache), the majority of locations in a guard map may contain the value zero. Accordingly, certain example embodiments store the bytes of the guard map after exclusive-or'ing them with the small-guard value, so that the majority of bytes in the guard map are the small-guard value. Furthermore, certain example embodiments mark the entire guard map as a guard(ed) region. As noted above, guard regions are regions of memory selectively identified by embodiments as areas that the application program has no valid reason to access. In this manner, example embodiments may use their checks on potential errant-memory updates to protect the integrity of its own guard maps. Similar techniques may be used to guard one or more types of other critical data.

Certain example embodiments may use different guard implementations for different regions of memory. A technique for efficiently implementing and checking for guard regions may be based on hybrid guard values. One attractive solution may be to protect stack memory with bipartite guards (thereby potentially obviating the need for guard-map updates when allocating/deallocating stack frames), and use homogenous guards to guard heap memory (where the guard map may be provided by the native heap manager). Using this configuration, the instrumentation for checking whether address A is safe can be implemented using the pseudo-code shown in FIG. 11.

The configuration shown in FIG. 11 can be extended in such a way that both types of guards are used in the heap: when the application program requests a heap block with N bytes, certain example embodiments may increase N to allow space for (one) guard value and then round up to the next power of two; it actually reserves M>N bytes. Certain example embodiments place a homogenous guard at the end of the M reserved bytes. The heap manager in some example embodiments provides a capability to look up an arbitrary address and determine if it is in an allocated block, and if so, the location and size of the block. Using this capability certain example embodiments implement a guard map for the homogenous guards placed at the end of blocks: if an address is at the end of the block, it is in the guard region. However, the malloc implementation in at least some embodiments need not necessarily record the original requested size, N, anywhere. Consequently, overruns that exceed N but still do not hit the guard at the end of the M-byte block may not be detected. To detect such overruns, some embodiments may place a bipartite guard after the Nth byte of the allocated block and prior to the homogenous guard at the end of the block. As described above, this provides the full strength of the homogenous guard (which provides better protection against misaligned accesses) for the end of the allocated block, while still providing some protection for overruns that surpass the Nth byte in the middle of the buffer.

In some embodiments, M may be greater than or equal to 2*N. In these cases, certain embodiments may place a homogenous guard at the (M/2)th byte, which is still easily located using the heap-management data structures. The presence or absence of a second, middle-of-buffer guard can be indicated with a single bit, which is much less than the amount of space needed to store N.

In some example implementations, any access to a guard region may be disallowed to a subject application program. In certain example embodiments, there additionally are (optionally) different classes of guard regions, or different guard classes. Different guard classes are given different semantic interpretations, e.g., as to what types of memory accesses (read or write) should be allowed for guard of a given class. The guard classes used by certain example embodiments may include, but are not limited to: read/write guards, read guard, page guard, unallocated memory guards, and cloneable read guards. Embodiments differ from conventional approaches by unifying the detection of different types of memory errors around the concept of guards and using different types of guards to detect different types of memory errors.

Read/write guards are configured so that any attempted read or write access indicates an error or attempted exploit of the subject program. Some form of read/write guards were introduced in K. Serebryany, D. Bruening, A. Potapenko, and D. Vyukov, "*AddressSanitizer: A Fast Address Sanity Checker*," in USENIX Annual Technical Conference, 2012, pp. 309-318.

Read guards are configured so that any attempted read access indicates an error or attempted exploit, but write accesses are allowed and cause embodiments to remove the guard. Read guards may be useful for detecting when the program attempts to read memory it has not yet initialized. An embodiment may, for example, insert read guards in newly allocated memory and memory that holds stale data; check potentially dangerous read accesses to ensure they are not accessing a read guard; and remove corresponding read guards when a write access to a read guard is detected.

Page guards are configured so that attempted read or write access of any byte on the page containing the guard indicates an error or attempted exploit. Embodiments may place page guards on code pages and use them to detect attempts to scan code pages, e.g., for return-oriented programming (ROP) gadgets. ROP is described in A. Bittau, A. Belay, A. Mashtizadeh, D. Mazieres, and D. Boneh, "*Hacking blind*," in Proceedings of the 35th IEEE Symposium on Security and Privacy, 2014.

Unallocated memory guards ("unalloc-mem") are configured such that any attempted read or write access indicates an error or attempted exploit of the subject program. Example embodiments, place unallocated memory guards in memory (e.g., heap memory) that the program was previously using but subsequently returned to the heap manager. An access of an unallocated-mem guard indicates a use-after-free error, which the embodiments may attempt to repair.

Cloneable read guards are configured to disallow read accesses, except for the purpose of cloning the protected memory region. Cloneable read guards may be valuable for avoiding or reducing false positives in the presence of certain types of initialization patterns.

The implementation of guards described above in one or more embodiments may be modified as follows to support different "guard classes." Small guard values can be the same for all guard classes. There may be different bipartite guards for each guard class, indicated by a few bits in one of the random bytes of the guard class. Guard maps are extended to indicate the class of each mapped guard. Guard checks are extended to consider the guard class. For example, the initial, cheap check can be the same for all checked memory accesses. The secondary check may differ depending on the type of access. For example, a read access may fail if any type of guard is found, and a write access may fail if any class of guard except a read guard is found. When a read guard is found upon a write, the read guards may be removed, and the check may be indicated having passed. A bulk access (i.e., a library call that reads or writes to a range of memory) may fail for page accesses that include a page guard.

When guard classes are implemented, the response provided when a check fails can also depend on the class of guard that caused the check to fail. For example, upon an attempted access of an unalloc-mem guard, an embodiment may attempt to restore the memory block, mark the block as allocated, and continue execution.

In addition, the different guard classes may be placed in different situations. If embodiments uses read/write guards to delineate program data, such guards may be placed at the end of heap blocks. Read guards may be placed in some or all of newly allocated heap or stack memory, and/or in memory that could have been written or overwritten by a library call, but was not. For example, a call read (fd, buf, M) may read up to Mbytes from fd into buf. If n<M bytes are actually read, then embodiments may place read guards in the (n−M) bytes of buf after the portion that was accessed by the call to read.

Certain example embodiments may optionally place page guards on pages holding code or other sensitive metadata, such as guard maps or heap maps. Hooking code, e.g., library calls that scan memory and checking that the scan may not access any page guards, can be used to detect unwarranted page scans. Moreover, certain example embodiments may optionally place unallocated-memory guards on heap blocks before they are placed into a free quarantine or they are returned to the heap manager.

As the subject program executes, the layout of its data in memory may change because memory regions are constantly allocated and released (deallocated). Memory that has been deallocated may subsequently be reused to fulfill a new memory-allocation need. During the preparation stage, an embodiment operates to learn the program's intended data layouts and modifies the layouts to allow room for guard regions. During the monitoring stage, embodiments help ensure that the guards are properly maintained (e.g., in accordance with the modified layouts) as memory is allocated and deallocated. As mentioned above, different mechanisms may be utilized for stack memory, heap memory, and static memory.

The subject application program may have multiple threads, each with a runtime stack that is typically used to store temporary data, such as the arguments and variables for a function invocation. On a function call to a function foo, a new region is allocated on the "top" of calling thread's stack, referred to herein as the activation record for foo. When foo's execution completes, its activation record is (implicitly) deallocated; the memory may be reused on subsequent function calls. At any time during execution, embodiments are configured to ensure (a) that there are guard regions delineating the data objects on the "live" portions of the runtime stacks, and (b) that it can reliably determine where these guard regions are.

Ideally, any used memory on the stack (e.g., memory past the current stack top) would be tracked as belonging to one or more guard region(s). One technique is to update the guards and guard maps on every allocation and deallocation of an activation record. On a function call to a function foo (causing the creation of an activation record), example embodiments modify the initialization of foo's activation record to initialize the desired guard regions in the activation record with guard values. It may also update the guard maps with the locations of the new guard regions. When foo's activation record is deallocated (either by a normal return or a non-local control transfer, such as an exception), the guard values are cleared, and the guard maps are updated to indicate those guard regions have been removed.

In some cases, the above strategy may have the lowest possible runtime overhead. In other cases, it may be inefficient, and it may be overly conservative. In particular, the above strategy assumes that when an activation record is deallocated, none of the memory is protected (in a guard region). In order to ensure that the system is protected, it may be desirable to protect all of that memory. One option is to fill the entire deallocated region with guard values and update the guard map (if any) appropriately. If the granularity of the guard map is chosen to match the activation record alignment, the update may be made considerably more efficient. Another option is to simply leave the guard values and guard map alone (e.g., to not change) during deallocation. This is extremely cheap in terms of processing time and processing cost, and provides partial protection for the deallocated region. In both of these cases, the extra guards are removed (at any time) before that region of the stack is re-used for a different allocation record. This can be done, for instance, when new activation records are allocated.

At least some example embodiments may be configured to intercept calls from the subject application program to system libraries, such as, for example, the heap-management library (malloc, realloc, free, etc.). The embodiments may entirely replace the heap-management library with an implementation that provides greater security. The DieHard and DieHarder libraries described in E. D. Berger and B. G. Zorn, "*DieHard: probabilistic memory safety for unsafe languages*," Proceedings of the 2006 ACM SIGPLAN Conference on Programming Language Design and Implementation, 2006, pp. 158-168, and G. Novark and E. D. Berger, "*DieHarder: securing the heap*," Proceedings of the 17th ACM Conference on Computer and Communications Security, 2010, pp. 573-584, are example libraries that provide greater security. In addition, on a call to allocate heap memory, example embodiments may increase the size of the requested allocations to allow room for a guard value, and place a guard at the end of the allocated block. The embodiments may also optionally clear the other bytes in the heap block to ensure that no stale data is leaked. Other aspects of the example embodiments' mechanism for maintaining guards in heap memory may depend on the heap-management library that is ultimately used.

Some heap-management libraries (e.g., such as DieHard) are able to efficiently determine if an address resides in a heap block, and if so, what the properties of that block are (i.e., start and end addresses, size, is it currently allocated, etc.). Certain example embodiments use this capability to implement a guard map for the heap. If for some reason the embodiments' heap-management library cannot be used, then the embodiments may use an external data structure, such as, for example, a trie, to implement the guard map for the heap. Using this approach, the data structure can be updated every time a call to allocate or free memory is intercepted.

A third option is to use bipartite guards in the heap instead of a guard map.

When the subject application program requests that a block of heap memory be deallocated, or freed, it indicates that the program does not intend to access that block again. Existing references to the block at the time it is freed are considered to be stale. The heap-management library is free to use the block to satisfy subsequent requests for memory. Use of a stale reference can lead to use-after-free vulnerabilities (e.g., as described in CWE 416), which cause the stale references to be aliased with new references when the block is re-allocated to fulfill a new allocation request.

Example embodiments may use many different techniques to reduce the likelihood of exploits of use-after-free vulnerabilities. Some embodiments, for example, may queue the program's requests for deallocation of blocks, thereby temporarily prolonging the "lifetime" of the block allocation before it is reclaimed for reuse. This technique protects against use-after-free vulnerabilities because an exploit cannot succeed until the block is reallocated.

Some embodiments may randomize the order in which deallocation requests are processed from the free list. This technique protects by making it difficult to predict the circumstances under which a block may be reallocated, which is an operational principle behind many successful exploits.

Some embodiments may protect against use-after-free vulnerabilities by, at some point before a block is re-allocated (e.g., before it officially deallocates the block by marking it available for allocation), storing a copy of some bytes of the block into the extra padding at the end of the block and/or overwrite some or all of the block with unalloc-mem guard values. One technique is to only place an unalloc-mem guard at the beginning of the heap block, although some implementations for checking for guards may not always catch accesses past the first word of the block. Some compensation for this may be based on the observation that frequently it is possible to infer the beginning of a block for a memory access that may access the middle of the block. For example, given a memory address (e.g., base+offset), often base may point to the beginning of the block, while (base+offset) may be in the middle of the block. Given a potentially unsafe memory access to (base+offset), some embodiments may check base for an unalloc-mem guard. If the guard values are accessed before the block is reallocated, (i) it indicates a use-after-free vulnerability and (ii) it may be detected. At that point, the embodiments may execute any of several repair strategies.

The heap-management implementation of certain example embodiments may allocate from the set of free blocks at random. As with some of the above described defenses, this makes it difficult to predict when the block may be reallocated, and it prolongs the time before the block is reallocated. Only when the block has finally been reallocated does a use-after-free exploit become possible.

The subject application program's static memory includes global variables and file-scope and function-scope static variables that have a fixed location potentially for the lifetime of the program. Each dynamic library used by the subject application program may have its own static data segment, which has a fixed layout while the library remains loaded. During the preparation stage, an example embodiment may modify the layout of static data to insert guard regions. During the monitoring stage, the example embodiment may use a hash table (or other suitable data structure) to track the locations of guard regions in the application program's static memory. When the application program's image or a dynamic library is loaded into memory, the example embodiment may initialize the guard regions in the static memory with guard values and update the guard map for static memory. When a dynamic library is unloaded from memory, the guard map for static memory is adjusted appropriately.

Application programs use multiple mechanisms to recycle their memory and keep their overall memory footprint low: when the application program has finished using a memory block for one purpose, it is repurposed for a different use, for example, by being "released" and then "reallocated." Many programs also contain defects such as "use of uninitialized memory" that can lead to sensitive data being exfiltrated from recycled memory regions. For example, here is one sequence of actions that might exfiltrate sensitive information to an attacker: the program allocates a block of memory; the program fills the block with sensitive information, e.g., a password; the program releases the block (without clearing its contents); the program reallocates the block for a new purpose; and subsequently, under the control of an attacker, the program reads and reports the contents of the block before overwriting some or all of the contents (i.e., the program reads contents that are "uninitialized" since the reallocation. As a result, the sensitive contents of the block from its last use are reported to the attacker.

Example embodiments use many heuristics to detect when memory is being reused and there may be a risk of leaking the old contents of the memory. The embodiments may be configured to use combinations of analyses and heuristics to determine when a buffer is being partially or completely reused.

Some embodiments may use explicit allocation to determine when a buffer is being partially or completely reused. In the explicit allocation technique, when an embodiment detects memory being (re)allocated via a call to malloc( ) or the creation of a new procedure frame, it may assume the new memory is being reused and should be considered "uninitialized."

Some embodiments use inferred recycling functions to determine when a buffer is being at least partially reused. When a function might return uninitialized heap memory (obtained via a call to malloc) or some other heap block, then certain embodiments may assume the function is implements heap-block recycling. A function that implements heap-block recycling arranges for reuse of heap blocks without returning them to the heap manager. Embodiments may rely on their respective implementation of malloc to dynamically check if a value returned by a potential recycling function is the beginning of a heap block.

Some example embodiments use a technique referred to as "fill gaps" in order to detect at least partial reuse of the freed memory block before re-initialization. Many library procedures may fill a variable amount of a buffer, up to some maximum number of bytes, M. At runtime, when the function actually fills just n bytes where n<M, the remaining (M−n) bytes are called the fill gap. According to the fill gap technique, example embodiments may assume that fill gaps should be considered to be uninitialized.

Some example embodiments use a technique referred to herein as "file-descriptor taint" in order to detect at least partial use of freed memory blocks. According to this technique, an example embodiment hooks calls to read( ), memcpy( ), and/or other memory-copying functions. The example embodiment may use space at the end of each heap block to record some file-descriptor taint about each heap block. When the application program reads input into a buffer and overwrites pre-existing data with tainted data from a different file descriptor, the example embodiment may conclude that the block is being reused, and that the old data can be cleared. This may happen during a call to read( ) or to memcpy( ) or some later functions.

Another technique used by some embodiments for recognizing that a heap block is being reused includes detecting when the following conditions hold: (1) the heap block is returned from a function that sometimes returns uninitialized memory acquired directly from malloc; and (2) the heap block is returned from a function that appears to take few external arguments, e.g., only a size argument. In these situations, it may be reasonable to assume that the function is "recycling" a heap block. In some embodiments, the heap block can be cleared before being returned. Yet another technique used in some embodiments for recognizing that a heap block is being reused includes recognizing when the heap block contains data originally read from an external source and that data is being overwritten with different data from an external source. In these cases, it may be reasonable to assume that the block is being used as a "read buffer" and clear the entire contents of the buffer, or at least the maximum extent of the buffer occupied by previously read or to-be-occupied by newly read data.

When an example embodiment determines that memory is being reused—e.g., that the current contents are stale and the memory should be overwritten before it is reused—it may use a combination of the following strategies: (1) clear the memory; (2) place a read guard in the memory and modify unsafe read instructions to first check for the read guard.

Another technique used in some embodiments for identifying memory regions that hold stale data intercepts code (e.g., library calls, inlined procedures, or loops) that may write a variable amount of memory up to a specified maximum. Any memory between the end of what is actually written and the specified maximum is considered to hold "stale" data that the subject program no longer needs.

When an example embodiment detects a vulnerability, it may use one or more of several repair techniques to remove the vulnerability or to reduce the risk posed by the vulnerability. In some cases, the embodiment may perform the repair such that the application program can continue execution.

As noted above, an example embodiment may sometimes detect an attempt to access a block that the application program previously freed (indicated that it was done with the block). In these cases, the embodiment may attempt to restore the values in the block, if they've been saved, or clear the block, mark the block as allocated and then allow the program to continue execution. Marking the block as allocated has the effect of reviving the stale references and ensuring that no new references may be made that alias the stale references; the stale references can be safely used as if the requested deallocation never happened. The application program execution may likely continue normally, and no use-after-free exploit may be possible.

The example embodiment may also note the calling context that caused the use-after-free. If a particular use-after-free pattern is observed frequently, embodiments may start tagging blocks according to where they were allocated, correlating the allocation tag with the use-after-free errors, and then taking appropriate responses when a free is performed on a block with an allocation-tag correlated with frequent use-after-free errors, e.g., by increasing the delay for that free.

In some cases, an example embodiment may detect an attempted overrun of a heap-allocated buffer. In these situations, there are several steps the embodiment may take to attempt to "grow" the buffer, essentially by performing a reallocation ("realloc( )") on the buffer. The reallocation may differ based on whether or not the neighboring heap block is allocated. If the block is not allocated, the embodiment may mark the block as allocated, and allow the "overrun" to proceed into the neighboring block. Effectively, the heap block is increased in size. If the neighboring block is already allocated, then the embodiment may take the following steps: allocating a larger block at some other location in memory; copy all of the data in the original heap block to the new heap block; overwriting all of the data in the original heap block with a homogeneous guard value; and redirecting all future attempts to access the original block to instead access the new block. The overwriting of all of the data in the original heap block ensures that any attempted access to the original heap block may be detected.

Some embodiments may be configured to replace over-reads with manufactured data. For example, when an example embodiment detects an attempt to read past the end of a buffer, instead of performing the read (and potentially releasing sensitive information), it may replace the results of the read with manufactured data and allow the program to continue execution. For example, the embodiment may return common sentinel values, such as 0 and −1, or random data.

Some embodiments may be configured for early loop termination for overwrites. For example, when an embodiment detects an attempt to write past the end of a buffer, instead of performing the write, it may be configured to terminate the loop that is attempting the write.

A technique used in some embodiments for automatically recovering from overruns of heap blocks when the adjacent heap block is not currently allocated includes: automatically detecting when the overrun occurs by detecting an attempted access of the guard region at the end of the heap block; automatically marking the adjacent heap block as allocated; and/or allowing the overrunning code to continue into the adjacent block.

Another technique used in some embodiments for automatically recovering from overruns of heap blocks may include: automatically detecting when the overrun occurs by detecting an attempted access of the guard region at the end of the heap block; allocating a new, larger block somewhere else in the heap; copying the data from the original block to the new block; converting the original block into a guard region so that future attempts to access the original block may be detected as attempted accesses to a guard region; and when future accesses to the original block are detected, redirecting the attempted access to instead access the new block. For write accesses, for example, the corresponding address of the new block can be updated. For read accesses, the corresponding values from the new block can be returned. In order to implement these accesses, loops and/or library calls that access a range of addresses beginning in the original block and continuing beyond its (original) end may be identified, and the accesses may be redirected to the new block.

It will be appreciated that certain example embodiments may run in connection with a standalone or networked computer and/or computer system comprising a plurality of computer nodes. In an example runtime environment, for example, an instance of a process for hardening application programs according to an embodiment may run in memory. Components may include, for example, memory, at least one processor, a data store, an OS kernel, etc. It will be appreciated that such an environment may be used in connection with, or be simply backed by an embodiment as shown in FIG. 3. It also will be appreciated that certain example embodiments may work in any design time and/or runtime environment including, for example, Windows, Linux, Unix, MacOS, and/or other operating systems present on the example electronic devices mentioned above. In a similar vein, the techniques described herein may be used in any suitable combination, sub-combination, or combination of sub-combinations, e.g., as appropriate to the programming language, runtime environment, etc. With respect to the former, for example, certain example embodiments may be made to work with programming languages including, for example, C, C++, Assembler, Java, etc. The programming language may be a compiled or interpreted language, and may run on a physical or virtual machine.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor (e.g., central processing unit (CPU) or specialized processor) execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A security-enhanced computing system, comprising:
processing resources including at least one memory and at least one physical hardware processor coupled thereto, wherein the processing resources are configured to execute a security-enhanced application program by at least:
defining a plurality of guard regions in the memory in relation to data objects formed by the security-enhanced application program;
inserting guards in the guard regions arranged in the memory, wherein the guards are structured to include at least first and second guard values, the guards being inserted in the guard regions and structured to facilitate at least first and second checks, the first check using the first guard value, the second check using the second guard value, the first check being less computationally intensive than the second check, the second check being structured to compensate for a false positive generated by application of the first check, the first and second guard values being different from each other;

determining whether an operation taken by the security-enhanced application program in connection with one of the guard regions arranged in the memory is disallowed by:

identifying an address associated with the operation, performing the first check in connection with the identified address, the first check generating output indicating that either the operation is allowed or that further scrutiny is needed, and performing the second check conditioned on the output generated by the first check indicating that further scrutiny is needed, the second check indicating whether the operation is disallowed; and modifying the execution of the security-enhanced application program in response to a determination that the operation is determined to be disallowed, but otherwise permitting the execution of the security-enhanced application program.

2. The system of claim 1, wherein the guards are bipartite guards having a predetermined number of bits.

3. The system of claim 1, wherein the first check includes detecting whether the first guard value is positioned in relation to the identified address.

4. The system of claim 3, wherein the second check includes detecting whether the second guard value is positioned in relation to the identified address.

5. The system of claim 1, wherein the second check includes detecting whether the second guard value is positioned in relation to the identified address.

6. The system of claim 1, wherein the second guard value includes the first guard value repeated a number of times therein.

7. The system of claim 1, wherein the modification includes generating a runtime exception in connection with the security-enhanced application program.

8. A method for executing a security-enhanced application program on a computing system comprising at least one memory and at least one processor, the method comprising:

defining a plurality of guard regions in the memory in relation to data objects formed by the security-enhanced application program;

inserting guards in each of the guard regions arranged in the memory, wherein the guards are structured to include at least first and second guard values, the guards inserted in each of the guard regions being structured to facilitate at least first and second checks, the first check using the first guard value, the second check using the second guard value, the first check being less computationally intensive than the second check, the second check being structured to compensate for a false positive generated by application of the first check, the first and second guard values being different from each other;

determining whether an operation taken by the security-enhanced application program in connection with one of the guard regions arranged in the memory is disallowed by:

identifying an address associated with the operation, performing the first check in connection with the identified address, the first check generating output indicating that either the operation is allowed or that further scrutiny is needed, and performing the second check conditioned on the output generated by the first check indicating that further scrutiny is needed, the second check indicating whether the operation is disallowed; and modifying the execution of the security-enhanced application program in response to a determination that the operation is determined to be disallowed, but otherwise permitting the execution of the security-enhanced application program.

9. The method of claim 8, wherein the guards are bipartite guards having a predetermined number of bits.

10. The method of claim 8, wherein the first check includes detecting whether the first guard value is positioned in relation to the identified address.

11. The method of claim 8, wherein the second check includes detecting whether the second guard value is positioned in relation to the identified address.

12. The method of claim 8, wherein the second guard value includes the first guard value repeated a number of times therein.

13. The method of claim 8, wherein the modification includes generating a runtime exception in connection with the security-enhanced application program.

14. A non-transitory computer readable storage medium storing a security-enhanced application program which, when executed by a processor of a computing system including a memory, causes the computing system to perform operations comprising:

defining a plurality of guard regions in the memory in relation to data objects formed by the security-enhanced application program;

inserting guards in the guard regions arranged in the memory, wherein the guards are structured to include at least first and second guard values, the guards being inserted in the guard regions and structured to facilitate at least first and second checks, the first check using the first guard value, the second check using the second guard value, the first check being less computationally intensive than the second check, the second check being structured to compensate for a false positive generated by application of the first check, the first and second guard values being different from each other;

determining whether an operation taken by the security-enhanced application program in connection with one of the guard regions arranged in the memory is disallowed by:

identifying an address associated with the operation, performing the first check in connection with the identified address, the first check generating output indicating that either the operation is allowed or that further scrutiny is needed, and performing the second check conditioned on the output generated by the first check indicating that further scrutiny is needed, the second check indicating whether the operation is disallowed; and modifying the execution of the security-enhanced application program in response to a determination that the operation is determined to be disallowed, but otherwise permitting the execution of the security-enhanced application program.

15. The non-transitory computer readable storage medium of claim 14, wherein the guards are bipartite guards having a predetermined number of bits.

16. The non-transitory computer readable storage medium of claim 14, wherein the first check includes detecting whether the first guard value is positioned in relation to the identified address.

17. The non-transitory computer readable storage medium of claim 16, wherein the second check includes detecting whether the second guard value is positioned in relation to the identified address.

18. The non-transitory computer readable storage medium of claim 14, wherein the second check includes detecting whether the second guard value is positioned in relation to the identified address.

19. The non-transitory computer readable storage medium of claim 14, wherein the second guard value includes the first guard value repeated a number of times therein.

20. The non-transitory computer readable storage medium of claim 14, wherein the modification includes generating a runtime exception in connection with the security-enhanced application program.

* * * * *